United States Patent Office 2,975,140
Patented Mar. 14, 1961

2,975,140

ORGANIC FINISH REMOVER AND METHOD

William L. Yaroch, deceased, late of South Dearborn, Mich., by Geraldine Yaroch, administratrix, Garden City, Mich., assignor to Klem Chemicals, Inc., Dearborn, Mich., a corporation of Michigan No Drawing. Original application July 27, 1954, Ser. No. 446,151. Divided and this application Nov. 29, 1957, Ser. No. 712,603

14 Claims. (Cl. 252—110)

This invention relates generally to an improved process for removing paints and synthetic coatings and compositions therefor, and more particularly to a composition and method for stripping paints, enamels, synthetic resin coatings and other organic finishes from metals and the surfaces of other materials. This application is a division of my co-pending application Serial No. 446,151, filed July 27, 1954, for "Organic Finish Remover and Method" and a continuation-in-part of Serial No. 103,951, filed July 9, 1949, for "Cleaning Solution for Removing Organic Finishes," both now abandoned.

In industrial production of automobiles, refrigerators, stoves and many similar commercial articles, a highly resistant and durable finish is applied to beautify and protect the same. Over the past years, these finishes have been greatly improved in regard to resistivity against attack by solvents and against other damage. At present, and in contrast to finishes in common use about 10 years ago, these finishes are highly complex in chemical structure, frequently containing synthetic resins having widely varying chemical structures and properties.

In the manufacture of the above articles, particularly when using mass production techniques, it is frequently necessary to remove the finish from imperfect or damaged articles. In normal operation, a certain percentage of the finished articles have flaws and require reprocessing, necessitating removal of the highly resistant finish. In addition, it is frequently desired to refinish painted articles, in which event it also is necessary or highly desirable to remove the original finish.

Prior to this invention, a large number of cleaning solutions have been suggested containing as a major ingredient sodium hydroxide or other alkali metal hydroxide. Frequently, these alkali metal solutions contain additives, such as cresylic acid or other phenolic compounds. Other cleaning solutions have alkali metal hydroxides, modified with water softening agents, dispersing agents, and suspending agents, such as various complex phosphates, silicates, and the like. The above discussed cleaning materials, while suitable for paints and other finishes in common use several years ago, are entirely unsuitable for many of the improved finishes presently in general use. In particular, they require excessively high concentrations of the alkali metal hydroxides which are hazardous, inconvenient, and disagreeable to use. Stripping operations using the above materials require long periods of contact of the finish with the cleaning solution, resulting in low production and increased cost of operations. In general, to effect attack of the finish by such prior cleaning solutions, high temperatures are required which increase the cost of operation and equipment. However, of primary importance, the above prior cleaning solutions do not remove a thin deposit of finish components which adhere tenaciously to the surface of the article and which must be removed prior to refinishing the article. In consequence, this deposit must be removed manually, which increases considerably the time and cost involved in the reclaiming of imperfect parts or articles.

In employing prior cleaning solutions for removing many present day finishes, after the bulk of the finish has been removed by the solution, the article or part must be brushed or rinsed several times to obtain a suitably clean surface, such as is necessary for refinishing the article. However, even after such repeated mechanical operations, the surface is not entirely free from foreign materials, which materials adversely affect the adherence of any subsequent finish. It appears therefore that the alkaline stripping compounds previously in use do not completely break or otherwise sever the adherent bond between the finished surface and the finish itself.

It is therefore a principal object of this invention to provide an improved cleaning solution and method for removing organic finishes such as paints, enamels, synthetic coatings and similar finishes. It is another object of the present invention to provide a composition of the above type and method which will leave the surface of the article or part in suitable condition for refinishing without the necessity of additional cleaning operations, such as brushing, scraping and the like. Another object of this invention is to provide a cleaning composition and method which will completely remove a large variety of finishes in a minimum period of time, at relatively low temperatures and while employing a minimum concentration of alkali metal hydroxide. Another object is to provide a continuous process adaptable to mass production techniques. Other objects of the invention will appear in the following description and appended claims.

Before explaining the present invention in detail, it is to be understood that this invention is capable of other embodiments and of being practiced or carried out in various ways. It is also to be understood that the phraseology or terminology employed herein is for the purpose of description and not of limitation.

I have now found that if gluconic acid or a water soluble salt or derivative thereof is added to alkali metal solutions, the resulting solution is materially and unexpectedly more reactive to paints, enamels, synthetic coatings and other organic finishes than aqueous alkali metal solutions themselves or any of the paint remover compositions heretofore known. The effectiveness of the gluconic acid or its derivative is particularly surprising in that solutions of gluconic acid have no effect on such finishes, in the absence of an alkaline metal. However, when combined with an alkali metal, the resulting solution is considerably more reactive to organic finishes than the alkali metal hydroxide itself. With such solutions, the time of stripping is considerably reduced, lower temperatures of operation are possible, lower concentrations of alkali metal hydroxide are permissible, but of primary importance, no residual film or composition remains on the surface of the part which necessitates brushing, scraping or other operations prior to refinishing of the article or part. Instead, after subjection of the finished article to an alkali metal solution containing a soluble gluconate, the part or article from which the finish is removed only requires at most a simple water rinse or wash and the so-treated surface is immediately ready for refinishing.

Of particular importance is the activity of the composition of this invention, containing gluconic acid, for many synthetic resin coatings which were entirely resistant, or practically resistant to prior paint remover compositions. Included in such coatings are alkyd resins, modified alkyd resins, such as styrenated alkyds, urea formaldehyde resins, melamine resins, metallic type paints, silicone resins, epoxy resins and the like.

It has also been found that when the above cleaning solution, i.e. containing an alkali metal hydroxide or basic salt thereof containing small quantities of a soluble gluconate, is modified with an organic nitrogen-containing base, e.g. an amine that the activity of the cleaning stolution is additionally increased. Such amines, when added to the above gluconate-containing solution attack many finishes heretofore resistant to chemical attack and, in general, decrease the time required for stripping the finish, permit lower temperature operation and lower the permissible alkali metal hydroxide concentration.

When using the cleaning solution and process of the present invention, the finish is attacked in a manner in which the bond at the inner face at the surface and finish is broken so as to completely free the finish from the surface. In consequence, after attack of the finish by the present cleaning solution, the finish particles can be easily and readily washed from the surface by simply spraying or flushing with water.

In operation, the alkali metal-gluconate solution, with or without a quantity of an amine, can be sprayed onto the finish to be removed or the articles having the finish to be removed can be immersed directly in a bath containing the cleaning solution. After contacting the finish with the improved cleaning solution of this invention, the part or article is then washed or sprayed with water to remove any traces or particles of removed finish. The article is then in condition for refinishing, if desired.

When using the composition and process of this invention for large scale operation, the parts or articles are preferably passed on a conveyor through a cleaning vessel having spray jets directing a stream of the cleaning solution on the surfaces to be removed. The cleaning vessel can also be provided with water jets to rinse the articles and also means to dry the cleaned articles, if desired.

The alkali metal hydroxides and basic salts thereof suitable for this invention are sodium hydroxide, potassium hydroxide, lithium hydroxide, rubidium hydroxide, cesium hydroxide and basic salts thereof, such as the carbonates, silicates, and phosphates. In addition to these, the solution can also contain soaps, resinates, or synthetic organic surface active agents and other water softening, sequestering, dispersing, or suspending agents.

The soluble gluconate can be added to the solution in any suitable form, such as gluconic acid, glucona delta lactone, sodium gluconate, potassium gluconate, or any other soluble salt of gluconic acid, or it can be added in a combined form with any of the organic nitrogen containing bases discussed in detail below. For example, gluconic acid can be first treated with aniline to produce aniline gluconate and the latter added to the alkali metal hydroxide.

The concentration of the alkali metal hydroxides can vary depending upon the types of finish, the quality of the paint bond, the temperature of the cleaning solution, and the time of contact of the finish with the cleaning solution. In general, the concentration should be between about 3–50 percent, based on the total weight of the solution. A more desired concentration of alkali metal hydroxide is between about 8–35 percent by weight of the total solution although the preferred concentration is between about 15–25 percent, based on the total weight of the solution.

The concentration of the gluconic acid should be above 0.05 percent by weight of the total solution. If a derivative of gluconic acid is employed, equal molar quantities of gluconate are employed. Relataively high concentrations can be used advantageously, although above 10 percent there is generally no appreciable increase in effectiveness. The higher concentrations of the gluconate are usually desirable when it is preferred to employ minimum concentrations of the alkali metal hydroxide. The preferred concentration of gluconate compound is between about 0.3–3.0 percent by weight of the weight of the alkali metal hydroxide.

As noted above, amines and certain other nitrogen containing compounds used with an alkali metal and gluconic acid or salt thereof further improves the reactivity of the solution toward paints, enamels, synthetic resins and other coatings. The amine compounds suitable for this invention are either aliphatic or aromatic, the latter being preferred. Of the aliphatic amines, the compound can be either primary, secondary or tertiary. Examples of such amines are ethylamine, dipropylamine, and tributylamine. In addition derivatives of ammonium hydroxide are also suitable, for example, tetramethyl ammonium hydroxide.

The preferred aromatic organic nitrogen-containing bases can either be cyclic or heterocyclic with the latter being preferred. Of the cyclic amines, either a mono-ring or multi-ring compound is suitable. Typical examples of such cyclic amines are aniline and benzidine. The preferred heterocyclic amine compounds also can be mono-ring or multi-ring, the mono-ring being preferred. Typical examples of the mono-ring heterocyclic amine compounds are furfurylamine, pyridine, and morpholine. In regard to activity, the furfurylamine is the most preferred. However, morpholine is also very effective and is commercially available in relatively large quantities at the present time. The multi-ring heterocyclic aromatic compounds suitable for this invention are acridine and other similar compounds.

The amine radical can also be substituted with an organic radical. For example, monoisopropanol amine, diisopropanol amine and triisopropanol amine are very effective.

Polyamines are also useful in accordance with the present invention. As examples, urea and dipropylene triamine are very effective. Thio-amine and cyclo amines can also be used. An example of an effective thio-amine is diethylthiourea and examples of cyclo amines are cyclohexyl amine and hexamethylene tetramine.

Nitriles such as acetone cyanohydrin are also suitable for this invention. Also, certain amides have also been found effective, for example, butyramide.

The concentration of the amine can vary between 0.5 and 1.5 moles per mole of gluconate compound employed. Preferably, a 1:1 mole ratio of amine and gluconate compound is employed.

With the present invention, a finish can be removed from a surface, such as a metal surface, not deleteriously attacked by the cleaning solution of this invention, by immersion of the surface in a vessel containing the alkali metal hydroxide and a soluble gluconate, with or without an amine. The finish is maintained in contact with the cleaning solution for a time sufficient to break the bond between the finish and the surface of the part or article and, if necessary, is thereafter rinsed or sprayed with water to remove all of the finished components. In general, the time of contact required is between ½ and 30 minutes, but normally, does not exceed five (5) minutes. Alternatively, the finish can be sprayed with the cleaning solution of this invention, in which case a water rinse is frequently unnecessary.

The temperature of the above solution can be varied between room temperature and the boiling temperature thereof, although, in general, it is preferred to use higher temperatures so as to decrease the time of contact of the finish with the cleaning solution. In any event, however, the present cleaning solution reduces the contact time when operating either at lower or higher temperatures.

The process of this invention has important application to a wide variety of surface coatings or finishes. As pointed out above, the present process is of particular importance in removing finishes formed from the synthetic resins, due to their resistance to strong alkalies and paint remover compositions heretofore known. Included in such synthetic resins are phenolformaldehyde, urea formaldehyde, maleic, coumarone-indene, silicone, epoxy and vinyl resins. Of peculiar importance, due to their extensive commercial use are the alkyl resins, and so-called modified alkyd resins. As is well known, the alkyl resins are condensation products of polyhydric alcohols and polybasic acids. Glycerol is presently the most widely used polyhydric alcohol, although ethylene, diethylene and triethylene glycols, sorbitol, mannitol, and pentaerythritol can also be used. Of the polybasic acids, phthalic anhydride is the most important. Other acids are succinic, adipic and sebacic.

Urea-modified alkyds or blends of urea-formaldehyde resins with oil-modified alkyds are frequently used in baking enamels. These enamels are highly resistant to normal alkali metal solutions, but can be readily removed by the process of this invention.

Melamine modified alkyd resins are also extensively used at the present time and can be readily removed by the process and composition of the present invention. Finishes of this type are produced by cooking together a melamine urea resin, pentaerythritol or glycerol, phthalic anhydride, and a drying oil, such as tung oil, cottonseed oil or the like.

The epoxy resins are used on many home appliances and are typically produced from epichlorohydrin, bisphenol and a drying oil. The straight epoxy resins are crosslinked with a diamine, such as ethylene diamine and can be dried at room temperature or an elevated temperature. Finishes of this type are exceptionally resistant to most solvents but can be removed by the process and composition of this invention.

The following are typical examples of the present process and of suitable cleaning solutions embodying the features of the present invention:

Example I

| | Ounces (by weight) |
|---|---|
| Sodium hydroxide | 10.8 |
| Sodium metasilicate | 1.2 |
| Sodium resinate | 0.6 |
| Sodium gluconate | 0.6 |

Twelve (12) ounces by weight of the above compositions were diluted with water to make up one gallon of cleaning solution. This solution was used at its boiling point to strip an enamel finish consisting of alkyd urea melamine containing titanium dioxide as the white pigment from refrigerator panels and electric automatic ironer panels. The panels were immersed in the cleaning solution for seven (7) minutes and the panels were then rinsed with water. The bond between the enamel and the metal surface was completely broken and the coating was completely rinsed from the metal with water. The metal surface was left extremely clean and was in excellent condition for immediate refinishing.

A solution of the same total concentration and using the same alkali stripping compound was made up without adding the sodium gluconate. Enameled strip portions from the same stock of panels were immersed for 45 minutes in this solution, heated to the boiling point. The panels were then rinsed several times with water without satisfactorily removing the finish from the panels.

Example II

| | Ounces (by weight) |
|---|---|
| Sodium hydroxide | 6.64 |
| Sodium metasilicate | 0.8 |
| Sodium resinate | 0.4 |
| Cresylic acid | 0.24 |
| Sodium gluconate | 0.4 |

Eight (8) ounces by weight of the above composition may be diluted with water to make one gallon of cleaning solution.

Example III

Twelve ounces of solid caustic soda were added to one gallon of water and heated to a rolling boil. In this solution was suspended a section cut from a standard automobile interior window molding having a modified alkyd finish. After three minutes, the section was withdrawn and rinsed with a stream of water. A film of pigment remained on the surface of the part. After rinsing, the part required brushing and scraping to remove the bulk of the finish. Thereafter a film adhered to the surface which could not be removed without vigorous mechanical abrasion.

Example IV 47 grams (½ mole) of aniline were mixed with 196 grams (½ mole) of gluconic acid. The gluconic acid was in a 50 percent by weight water solution. To the aniline and gluconic acid solution was added 480 grams of water.

The test of Example III was repeated except that 1.2 ounces of the aniline gluconate, prepared as above, was added to the caustic soda solution. A section of the same stock used in Example III was then immersed in the solution for a period of three minutes. It was thereafter rinsed with water. The metal was completely free of paint and pigment film and was immediately in condition for refinishing.

Example V

Example III was repeated using 12 ounces of a modified caustic soda solution in one gallon of water. This modified caustic soda solution had the following composition in percent by weight:

| | Percent |
|---|---|
| Sodium hydroxide | 85 |
| Trisodium phosphate | 11 |
| Cresylic acid | 2 |
| Rosin soap | 2 |

The above solution was heated to a rolling boil and a finished part corresponding to those used in Examples III and IV was immersed in the boiling solution. After three minutes, the part was withdrawn and rinsed. The metal surface was covered with a thin film of pigment similar to that of Example III which required brushing, scraping and vigorous mechanical abrasion to make the surface suitable for refinishing.

Example VI

Twelve ounces of the modified sodium hydroxide cleaning solution of Example V were added to a gallon of water. 1.2 ounces of the aniline gluconate prepared as in Example IV were added to this solution. The latter was heated to a rolling boil and a part similar to those of the above examples was immersed in the solution. After three minutes, the part was removed and rinsed and the finish thereof was entirely free of paint and pigment film and was in condition for immediate refinishing.

Example VII

Example IV was repeated using potassium hydroxide instead of sodium hydroxide. In this example, 12 ounces of potassium hydroxide were dissolved in one gallon of water and 1.2 ounces of aniline gluconate were added to the potassium hydroxide solution. After immersion of a similar part to those used in the examples above for three minutes, all of the finish was completely removed from the surface of the part and the surface was in condition for refinishing without scraping, brushing or the like.

Example VIII

Example IV was repeated except that equal molar quantities of furfuryl amine was substituted for the aniline. Upon immersion of a similar part for three minutes, the finish was readily removed by a water wash and the part was in condition for refinishing.

Example IX

The above tests were repeated using pyridine in equal mole ratios to gluconic acid, similar results being obtained.

Example X

Morpholine was substituted in the same mole ratio for aniline in Example IV. Similar results were obtained.

Example XI

Twelve ounces of caustic soda were dissolved in one gallon of water. To this solution was added 5 percent by weight of gluconic acid and an equal molar quantity of acetone cyanohydrin. The resulting solution was brought to a rolling boil and a part similar to that employed in the above examples was immersed for three minutes. Upon removal and washing with water, all traces of the finish and pigment were completely removed from the part.

When aniline, ethylamine, dipropylamine, tributylamine, monoisopropanol amine, diisopropanol amine, triisopropanol amine urea, dipropylene triamine, diethylthiourea, cyclohexyl amine or hexamethylene tetramine are substituted for aniline in Example IV, generally similar results are obtained.

Example XII

The above example was repeated except that butyramide was substituted for acetone cyanohydrin. Generally similar results were obtained.

When other alkali metal hydroxides, such as potassium and lithium are used in the above examples, similar results are obtained.

In the following examples listed in Tables I and II the cleaning solutions were prepared by dissolving solid alkali metal hydroxide in water. This solution was then separated into equal parts. To one part gluconic acid or a derivative was added and the second part was employed as a control. Sections of duplicate parts were contacted with the two solutions and the time noted in each case which was required to remove the finish from the part. The composition of the stripping solution in Table II corresponded to that employed in Example I above.

TABLE III

[Other alkali metal compositions suitable for this invention]

| Alkali hydroxide | | Gluconate | | Amine | |
|---|---|---|---|---|---|
| Type | Percent[1] | Type | Percent[2] | Type | Moles[3] |
| NaOH | 5 | Acid | 1.0 | Aniline | 1.0 |
| NaOH | 10 | do | 1.0 | None | ----- |
| NaOH | 15 | do | 1.0 | Aniline | 1.0 |
| NaOH | 20 | do | 1.0 | None | ----- |
| NaOH | 25 | do | 1.0 | Aniline | 1.0 |
| NaOH | 35 | do | 1.0 | None | ----- |
| KOH | 15 | do | 1.0 | Aniline | 1.0 |
| KOH | 15 | do | 1.0 | None | ----- |
| NaOH | 15 | Na salt | 1.0 | Aniline | 1.0 |
| NaOH | 15 | Acid | 0.5 | do | 1.0 |
| NaOH | 15 | do | 5.0 | do | 1.0 |
| NaOH | 15 | do | 10.0 | do | 1.0 |
| NaOH | 15 | do | 10.0 | None | ----- |
| NaOH | 15 | do | 1.0 | Morpholine | 1.0 |
| NaOH | 15 | do | 1.0 | Furfuryl amine | 1.0 |
| NaOH | 15 | do | 1.0 | Pyridine | 1.0 |
| NaOH | 15 | do | 1.0 | Aniline | 0.5 |
| NaOH | 15 | do | 1.0 | do | 2.0 |

[1] Percent by weight of the total solution in water.
[2] Percent by weight of the weight of the alkali metal hydroxide.
[3] Moles per mole of gluconic acid.

The preferred finish remover composition of this invention contains other materials, such as surface active agents, sequestering agents, dispersing agents and suspending agents. The following aqueous compositions are preferred. All quantities are in percent by weight.

Alkali metal hydroxide _____ 3–50
Alkali metal metasilicate _____ 0.5–10
Alkali metal resinate _____ 0.2–10
Water soluble gluconate _____ 0.3–10

The above composition can also contain a quantity of an amine, preferably equal to stoichiometric quantities, based on the weight of the water soluble gluconate.

TABLE I

| Number | Alkali Metal | | Gluconate | | Time (Minutes) | | Finish type | Remarks |
|---|---|---|---|---|---|---|---|---|
| | Type | Percent[1] | Type | Percent[2] | Contact[3] | Water rinse | | |
| 1a | NaOH | 5 | Acid | 0.1 | 20 | 1 | Alkyd urea melamine | Finish completely removed. |
| 1b | NaOH | 5 | None | ----- | 60 | 5 | do | Heavy pigment film remained. |
| 2a | NaOH | 10 | Acid | 0.1 | 9 | 1 | do | Finish completely removed. |
| 2b | NaOH | 10 | None | ----- | 30 | 5 | do | Heavy pigment film remained. |
| 3a | NaOH | 15 | Acid | 0.1 | 3½ | 1 | do | Finish completely removed. |
| 3b | NaOH | 15 | None | ----- | 30 | 10 | do | Heavy pigment film remained. |
| 4a | NaOH | 20 | Acid | 0.1 | 2 | 1 | do | Finish completely removed. |
| 4b | NaOH | 20 | None | ----- | 30 | 10 | do | Heavy pigment film remained. |
| 5a | NaOH | 25 | Acid | 0.1 | 1½ | 1 | do | Finish completely removed. |
| 5b | NaOH | 25 | None | ----- | 30 | 5 | do | Heavy pigment film remained. |
| 6a | NaOH | 30 | Acid | 0.1 | ¾ | 1 | do | Finish completely removed. |
| 6b | NaOH | 30 | None | ----- | 30 | 5 | do | Heavy pigment film remained. |

[1] Weight percent of total weight of solution.
[2] Weight percent based on weight of alkali metal hydroxide.
[3] Time required to remove finish.

TABLE II

| Number | Panel | | Stripping Composition | |
|---|---|---|---|---|
| | Color | Finish type | 12 ounces/gal. of composition of Example I, 212° F.[1] | Control composition of Example I[2] |
| 1 | Black | Soya resin, tung oil, ester gum and melamine, with primer. | Completely removed in 5 minutes. | Removed finish in 6 minutes. Removed primer in 12 minutes. |
| 2 | Blue | Lacquer, nitrocellulose cocoanut alkyd with plasticizer. | Removed finish in 3 min. Removed primer in 5 min. | Removed finish in 4 minutes. Removed primer in 15 minutes. |
| 3 | Powder blue | Soya-melamine | Removed finish in 5 min. | Removed finish in 13 minutes. |

[1] In all cases the finish, primer and pigment was completely removed from metal panel.
[2] In each case a heavy pigment film remained on the surface.

What is claimed is:

1. A process for stripping a colored synthetic resin finish of the type consisting of alkyd resins and epoxy resins which leave an adherent pigment deposit on a finished surface when treated with concentrated alkali metal hydroxide solutions, comprising the steps of contacting the finish with an aqueous solution consisting essentially of water, between about 3 and about 50 weight percent of an alkali metal hydroxide, and between about 0.3 and about 10 weight percent of a water soluble gluconate for a time sufficient to loosen the finish from the surface and completely break the bond between the finish and said surface, and thereafter removing said loosened finish completely from said surface.

2. The process of claim 1 wherein said aqueous solution also contains from about 0.5 to about 10 weight percent of a water softening agent selected from the group consisting of alkali metal silicates and phosphates.

3. A process for stripping a synthetic resin finish which leaves an adherent pigment deposit on a finished surface when treated with strong, alkali metal materials, comprising the steps of contacting the finish with an aqueous solution consisting essentially of water, between about 3 and 50 weight percent of an alkali metal hydroxide, between about 0.5–10 weight percent of a material selected from the group consisting of sodium metasilicate and trisodium phosphate, between about 0.2–10 weight percent of an alkali metal resinate and between about 0.3–10 weight percent of a water soluble gluconate for a time sufficient to loosen the finish from the surface, and thereafter removing said loosened finish from the surface.

4. A process for stripping a snythetic resin finish which leaves an adherent pigment deposit on a finished surface when treated with strong, alkali metal materials, comprising the steps of contacting the finish with an aqueous solution consisting essentially of water, between about 3 and 50 weight percent of an alkali metal hydroxide, between about 0.5–10 weight percent of sodium metasilicate, between about 0.2–10 weight percent of an alkali metal resinate and between about 0.3–10 weight percent of a water soluble gluconate for a time sufficient to loosen the finish from the surface, and thereafter removing said loosened finish from the surface.

5. A stripping solution for removing colored synthetic resin finishes which leave an adherent pigment deposit on a finished surface when treated with strong alkali materials, the solution consisting essentially of an aqueous solution of water, between about 3–50 percent by weight of an alkali metal hydroxide, between about 0.5–10 percent by weight of a material selected from the group consisting of alkali metal metasilicates and trialkali metal phosphates, between about 0.2–10 percent by weight of an alkali metal resinate and between about 0.3–10 percent by weight of a water soluble gluconate.

6. The stripping solution of claim 5 wherein the gluconate is an amine gluconate.

7. The stripping solution of claim 5 in which the alkali metal hydroxide concentration is between about 15–25 percent.

8. A stripping solution of claim 5 wherein the concentration of the alkali metal gluconate is between about 0.3–3.0 weight percent of the alkali metal hydroxide.

9. The stripping solution of claim 6 wherein the amine gluconate is an aromatic amine gluconate.

10. The stripping solution of claim 9 wherein the aromatic amine gluconate is a heterocyclic amine gluconate.

11. The stripping solution of claim 10 in which the heterocyclic amine gluconate is furfuryl amine gluconate.

12. The stripping solution of claim 10 in which the heterocyclic amine gluconate is morpholine gluconate.

13. A stripping solution for removing colored synthetic resin finishes which leave an adherent pigment deposit on a finished surface when treated with strong alkali materials, the solution consisting essentially of an aqueous solution of water, between about 3–50 percent by weight of an alkali metal hydroxide, between about 0.5–10 percent by weight of an alkali metal metasilicate, between about 0.2–10 percent by weight of an alkali metal resinate, and between about 0.3–10 percent by weight of a water soluble gluconate.

14. The stripping solution of claim 13 wherein the gluconate is an amine gluconate.

References Cited in the file of this patent

UNITED STATES PATENTS

| | | |
|---|---|---|
| 1,230,668 | Casmire | June 19, 1917 |
| 1,355,074 | Cleveland | Oct. 5, 1920 |
| 1,744,463 | Gravell | Jan. 21, 1930 |
| 2,145,827 | Chester | Jan. 31, 1939 |
| 2,584,017 | Dvorkovitz et al. | Jan. 29, 1952 |

FOREIGN PATENTS

| | | |
|---|---|---|
| 885,521 | France | May 31, 1943 |